Sept. 9, 1958  F. E. BOWMAN ET AL  2,850,798
METHOD OF BONDING ZIRCONIUM
Filed May 3, 1954
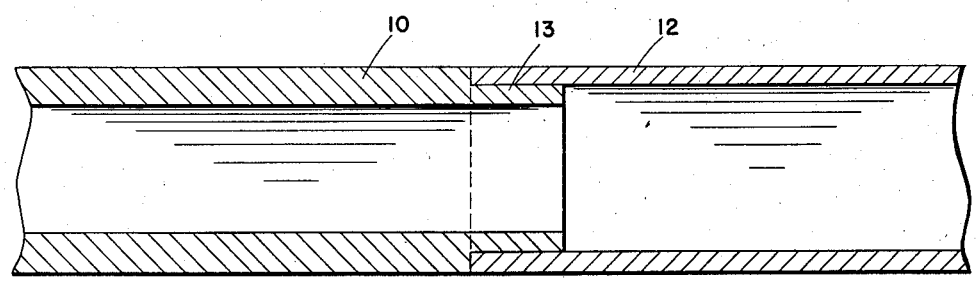
INVENTORS.
FRED E. BOWMAN
BY EDWARD L. REED
William R. Lane
ATTORNEY

2,850,798

METHOD OF BONDING ZIRCONIUM

Fred E. Bowman, Whittier, and Edward L. Reed, Bellflower, Calif., assignors, by mesne assignments, to the United States of America as represented by the United States Atomic Energy Commission Application May 3, 1954, Serial No. 426,952

6 Claims. (Cl. 29—482)

This invention relates to a method of joining zirconium to a dissimilar metal. More particularly, this invention relates to a method of joining zirconium tubes to tubes primarily made from iron transition group metals.

The technology of joining zirconium to various metals is relatively new. Heretofore, no practical way has been found for joining zirconium to dissimilar metals to provide a leak-proof joint. It has been found that a particular series of critical steps are necessary to satisfactorily join zirconium to a dissimilar metal. By the use of the herein-described invention leak-proof welds have been formed between zirconium tubes and tubes of such dissimilar materials as 12% chrome stainless steels, chrome-nickel steels, iron, and nickel.

The principal object of this invention is to provide a method of joining zirconium to various dissimilar metals.

A further object of this invention is to provide a method of joining zirconium tubes to tubes of various dissimilar metals.

A still further object of this invention is to provide a critical heating cycle to a zirconium and dissimilar metal joint to promote the formation of a low melting point intermetallic alloy at the interface of the zirconium and the dissimilar metal.

An additional object of this invention is to provide a method for bonding zirconium tubes to tubes made from stainless steel and the like.

Other objects of invention will become apparent from the following description taken in connection with the accompanying drawing, in which the single figure shows a longitudinal cross-sectional view of a typical overlapped tube joint which may be made by practicing the instant invention.

The drawing shows a section of stainless steel or other dissimilar metal tube 10 having a shoulder 13 cut around the periphery of the tube 10. An overlapping tube 12 of zirconium, having an inside diameter slightly larger than the outside diameter of the shoulder 13, is placed in loose fit over the shoulder portion 13.

The particular series of critical steps necessary to satisfactorily join the zirconium tube to the dissimilar metal tube are threefold. The adjoined area must first be heated to approximately 1000° C. and second, such temperature must be maintained for approximately five minutes. Further, this heating step must be accomplished in an evacuated or inert atmosphere. It has been found that the temperature may vary from 975° to 1025° C. and the time may vary from three to seven minutes. Satisfactory joints may be obtained in these ranges. The heating of the zirconium and the dissimilar metal is such that a low melting point alloy or intermetallic compound is formed at the interface of the two members. In the following the above procedure there is wetting at both ends of the joint which insures good bonding.

The above set-out method is not limited to the joining of tubes alone since it is only necessary that the zirconium and other metal surfaces be in contact prior to the heating steps. Thus, other types of joints can be made using the above procedures. The above-described loose fit or "contact" is such that enough expansion of the dissimilar metal should be present in order to slightly deform the zirconium.

The use of an induction furnace has been found to be most convenient for heating the area to be joined. However, any conventional heating means capable of close temperature control such as a salt bath may be used to heat the joint area. It is necessary that the heating step be carried out under the provision of a protective atmosphere or in an evacuated area. A vacuum of one micron or the like or an atmosphere of helium or argon serves the purpose of protecting the joint area from the effects of atmospheric air. Although the invention is especially useful for the joining of zirconium to various stainless steels, the instant process is also applicable to joining other dissimilar metals such as the transition metals of the iron group to zirconium. Besides the conventional chrome and chrome-nickel stainless steels, any iron, nickel or cobalt tubing, or the like, may be joined to the zirconium by the above method.

Although the invention has been described and illustrated in detail, it is to be clearly understood that the same is by way of illustration and example only and is not to be taken by way of limitation, the spirit and scope of this invention being limited only by the terms of the appended claims.

We claim:

1. The method of joining zirconium to first transition series metals and their alloys comprising placing a zirconium member in overlapping relation with a first transition series member and, while holding said members in fixed contact, heating said members at from 975° to 1025° C. for approximately three to seven minutes whereby an intermetallic compound is formed at the interface of the zirconium and transition metal, said heating taking place in an inert environment.

2. The method of joining zirconium to at least one metal selected from the group consisting of chromium, iron, cobalt and nickel comprising placing a zirconium member in contact with said metal member, placing said materials in an evacuated atmosphere to exclude gaseous reactive constituents, and, while holding said members in fixed contact, heating said members at a temperature from 975° to 1025° C. for approximately five minutes whereby a low melting point alloy is formed at the interface of the two members.

3. The method of joining zirconium to a ferrous alloy comprising placing a zirconium member in contact with said ferrous alloy member, providing an inert environment around said members, and, while holding said members in fixed contact, heating said members at a temperature of from 975° to 1025° C. for approximately five minutes, whereby an intermetallic compound is formed at the interface of the two members.

4. The method of leak-proof joining a zirconium tube member to a tube composed of at least one metal selected from the group consisting of chromium, iron, cobalt, and nickel comprising forming a peripheral shoulder portion on at least one end of said dissimilar metal tube, placing the zirconium tube member in peripheral close-fitting overlapping relation with said shoulder, exposing said member to an inert atmosphere, and heating said tube members to approximately 1000° C. for approximately five minutes while said members are in said inert atmosphere.

5. The method of leak-proof joining a zirconium tube member to a tube of ferrous alloy comprising forming a peripheral shoulder portion on at least one end of said ferrous alloy tube, placing the zirconium tube member in peripheral close-fitting overlapping relation with said shoulder, placing said members in an inert atmosphere, and heating said members at a temperature from 975° to 1025° C. for from three to seven minutes.

6. The method of leak-proof joining a zirconium tube member to a stainless steel tube member comprising forming a peripheral shoulder portion on said stainless steel tube member, placing the zirconium tube member in peripheral close-fitting relation around said shoulder portion, and heating said tubes at a temperature from 975° to 1025° C. for from three to seven minutes in an inert atmosphere, whereby an intermetallic compound is formed at the interface of said zirconium tube and the shoulder of said stainless steel tube.

References Cited in the file of this patent

UNITED STATES PATENTS

| | | |
|---|---|---|
| 1,716,195 | Stockstrom | June 4, 1929 |
| 2,226,944 | Reeve | Dec. 31, 1940 |
| 2,322,507 | Cole | June 22, 1943 |
| 2,373,117 | Hobrock | Apr. 10, 1945 |
| 2,627,110 | Hickey | Feb. 3, 1953 |

FOREIGN PATENTS

| | | |
|---|---|---|
| 609,035 | Great Britain | Sept. 24, 1948 |